US012304317B2

(12) United States Patent
Fu et al.

(10) Patent No.: US 12,304,317 B2
(45) Date of Patent: May 20, 2025

(54) AUXILIARY FORCE CONTROL SYSTEM AND METHOD FOR POWER-ASSISTED BICYCLE

(71) Applicant: SINBON ELECTRONICS COMPANY LTD., New Taipei (TW)

(72) Inventors: Ping-Chen Fu, New Taipei (TW); Tsai-Huan Lin, New Taipei (TW); Pawat Chunhachatrachai, New Taipei (TW)

(73) Assignee: SINBON ELECTRONICS COMPANY LTD., New Taipei (TW)

( * ) Notice: Subject to any disclaimer, the term of this patent is extended or adjusted under 35 U.S.C. 154(b) by 471 days.

(21) Appl. No.: 17/585,533

(22) Filed: Jan. 26, 2022

(65) Prior Publication Data

US 2023/0166604 A1    Jun. 1, 2023

(30) Foreign Application Priority Data

Nov. 29, 2021  (TW) .................................. 110144428

(51) Int. Cl.
*B60L 15/20* (2006.01)
*B62J 45/20* (2020.01)
(Continued)

(52) U.S. Cl.
CPC .............. *B60L 15/20* (2013.01); *B62J 45/20* (2020.02); *B62J 45/411* (2020.02); *B62J 45/412* (2020.02); *B60L 2200/12* (2013.01)

(58) Field of Classification Search
CPC ....... B60L 15/20; B60L 2200/12; B62J 45/20; B62J 45/411; B62J 45/412; B62M 6/50
See application file for complete search history.

(56) References Cited

U.S. PATENT DOCUMENTS

2018/0057015 A1* 3/2018 Barke ................. B60W 50/085
2020/0010148 A1   1/2020 Shimazu et al.
(Continued)

FOREIGN PATENT DOCUMENTS

CN    108082386 A      5/2018
CN    110126955 A  *   8/2019
(Continued)

OTHER PUBLICATIONS

Machine Translation TW-201341261-A (year: 2013).*
Machine Translation CN-110126955-A (year: 2019).*
Machine Translation CN-113247168-A (year: 2021).*

*Primary Examiner* — Jean Paul Cass
*Assistant Examiner* — Lidia Kwiatkowska
(74) *Attorney, Agent, or Firm* — Birch, Stewart, Kolasch & Birch, LLP

(57) ABSTRACT

An auxiliary force control system and a method for a power-assisted bicycle are disclosed. The system has a sensing device, a mobile computing device, a first controller, and a second controller. The sensing device receives a riding torque and a riding speed. The mobile computing device generates a tuning factor via a first and a second ANN model. Personal data and historical riding data are input data of the first ANN model. Predicted grade outputted by the first ANN model, the personal data, and environment data are input data of the second ANN model. The first controller generates a final factor according to the tuning factor, a mode factor, and a gap-range factor. The second controller outputs a motor driver current according to a parameter of target output of the motor, which is generated based on the final factor, to the motor to drive the motor.

7 Claims, 4 Drawing Sheets

(51) Int. Cl.
*B62J 45/411* (2020.01)
*B62J 45/412* (2020.01)

(56) References Cited

U.S. PATENT DOCUMENTS

2021/0009226 A1* 1/2021 Yamamoto ............... B62J 43/13
2022/0176829 A1* 6/2022 Haugen .................. B60L 3/106

FOREIGN PATENT DOCUMENTS

| CN | 113247168 A | * | 8/2021 | |
|----|----|----|----|----|
| TW | 201341261 A | * | 10/2013 | .............. B60L 50/20 |
| TW | 201412596 A | | 4/2014 | |
| WO | WO-2021186315 A1 | * | 9/2021 | ............ B62J 45/411 |

* cited by examiner

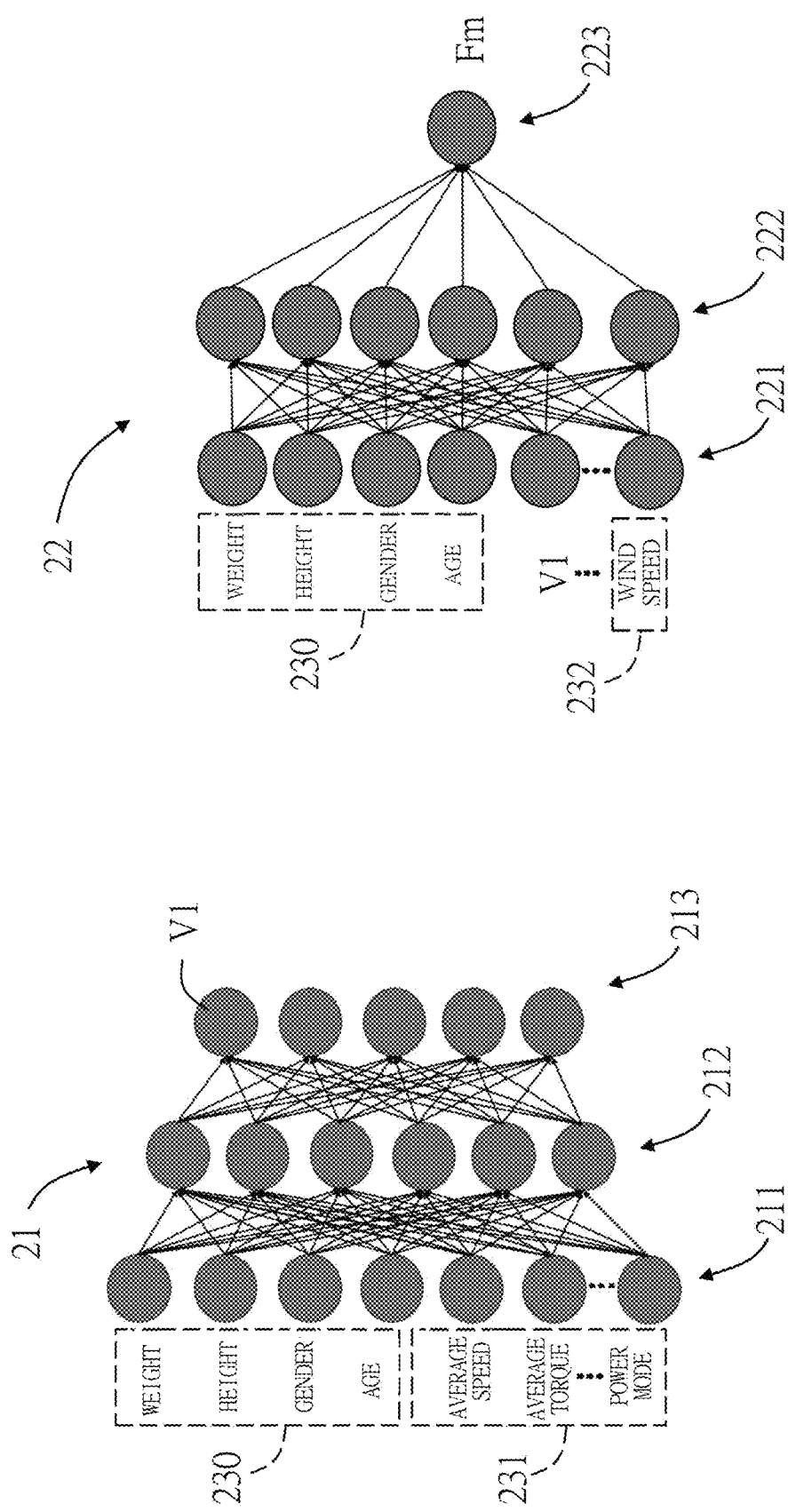

AUXILIARY FORCE CONTROL SYSTEM AND METHOD FOR POWER-ASSISTED BICYCLE

CROSS REFERENCE TO RELATED APPLICATIONS

The present application claims priority to Taiwan application No. 110144428, filed on Nov. 29, 2021, the content of which is hereby incorporated by reference in its entirety.

BACKGROUND OF THE INVENTION

1. Field of the Invention

The present application relates generally to a control system and a method, and more particularly to an auxiliary force control system and method for a power-assisted bicycle.

2. Description of Related Art

The main motive power of a traditional bicycle is from the user. In other words, regarding the operation of the traditional bicycle, the user's feet exert force on the pedals to rotate the cranks to drive the wheels through the gear disc and the chain, and the traditional bicycle will move forward. In order to provide the user with an effort-saving riding experience, a power-assisted bicycle has been developed. A conventional power-assisted bicycle has a motor and a throttle handle. The motor is connected to the wheel through a transmission machinery of the conventional power-assisted bicycle. The user may grip the throttle handle. When the user is riding the conventional power-assisted bicycle, the user's wrist may exert force on the throttle handle to rotate it. The rotation position of the throttle handle corresponds to the motivation output of the motor. However, when the user bikes on a long trip, the user's wrist has to continuously exert the strength to rotate and maintain the position of the throttle handle for a long time, such that the user may feel inconvenient and fatigued.

Another conventional power-assisted bicycle may not have the throttle handle. When the user is riding on it, the motor may automatically exert a dynamic auxiliary force on the wheel. For example, the user may exert a torque of 120 Nm on the traditional bicycle to move it from a stationary state. When the user rides the conventional power-assisted bicycle, the user can only use 100 Nm sufficient to move the conventional power-assisted bicycle from the stationary state because the motor additionally provides an auxiliary force of 20 Nm. Then, the effort-saving effect would be achieved.

The dynamic auxiliary force provided from the conventional power-assisted bicycle is estimated by the manufacturer's riding test implemented by R&D (Research and Development) people or professional cyclists. However, the power-assisted bicycles are sold to ordinary users. Cycling habits, riding techniques, riding skills, body shapes, weights, and the stamina while riding of the ordinary users are distinct from those of the R&D people and the professional cyclists. The auxiliary force provided by the conventional power-assisted bicycle is monotonous and invariant. When the ordinary users purchase the conventional power-assisted bicycles, its auxiliary force may not be suitable for their riding demands. For example, someone may think the auxiliary force is too high to have substantially exercise effects. Or, someone may think the auxiliary force is too low to get effort-saving effects. Consequently, the ordinary users may not adapt to the conventional power-assisted bicycles easily and feel troublesome while riding.

SUMMARY OF THE INVENTION

An objective of the present invention is to provide an auxiliary force control system and method for a power-assisted bicycle, for the purpose of controlling the motor of the power-assisted bicycle to provide a suitable auxiliary force for different users, so as to overcome the problem of the prior art.

The auxiliary force control system of the present invention is applied to a power-assisted bicycle having a motor. The auxiliary force control system comprises a sensing device, a mobile computing device, a first controller, and a second controller. The sensing device is mounted on the power-assisted bicycle to receive a riding torque and a riding speed. The mobile computing device generates a tuning factor via a first Artificial Neural Network (ANN) model and a second ANN model, wherein personal data and historical riding data are input data of the first ANN model; a predicted grade outputted by the first ANN model, the personal data, and environment data are input data of the second ANN model; and the tuning factor is output data of the second ANN model. The first controller is mounted on the power-assisted bicycle, signally connected to the mobile computing device to receive the tuning factor and generates a final factor according to the tuning factor, a mode factor of the power-assisted bicycle, and a gap-range factor. The second controller is mounted on the power-assisted bicycle, signally connected to the sensing device, the first controller, and the motor, and comprises an intelligent module and a safety control module. The intelligent module generates a parameter of target output of the motor according to the final factor, the riding torque, and the riding speed. The safety control module generates a motor driver current according to the parameter of target output of the motor and outputs the motor driver current to the motor to drive the motor.

The auxiliary force control method of the present invention comprises steps of:

generating a tuning factor via a first Artificial Neural Network (ANN) model and a second ANN model by a mobile computing device, wherein personal data and historical riding data are input data of the first ANN model;

a predicted grade outputted by the first ANN model, the personal data, and environment data are input data of the second ANN model; and the tuning factor is output data of the second ANN model;

generating a final factor according to the tuning factor, a mode factor of the power-assisted bicycle, and a gap-range factor by a first controller; and generating a parameter of target output of a motor by a second controller according to the final factor, a riding torque, and a riding speed, generating a motor driver current by the second controller according to the parameter of target output of the motor, and outputting the motor driver current to the motor by the second controller to drive the motor.

The present invention adopts the mobile computing device to perform the computation of the programming codes of the artificial intelligent algorithms of the first ANN model and the second ANN model to generate the tuning factor. The tuning factor is computed based on the user's physical fitness and the on-site environment, to be one of the factors for controlling the motor. By doing so, the motor may provide the suitable auxiliary force for different users and different riding environments. As a result, compared with riding the conventional power-assisted bicycle that only provides the monotonous auxiliary force, the user will comfortably ride the power-assisted bicycle of the present invention by the smooth intelligent assistance, without feeling whether the motor is outputting or stopping outputting the auxiliary force.

BRIEF DESCRIPTION OF THE DRAWINGS

FIG. 2 is a schematic diagram of a first ANN model of the present invention;

FIG. 3 is a schematic diagram of a second ANN model of the present invention;

DETAILED DESCRIPTION OF PREFERRED EMBODIMENT(S)

Figure 1:
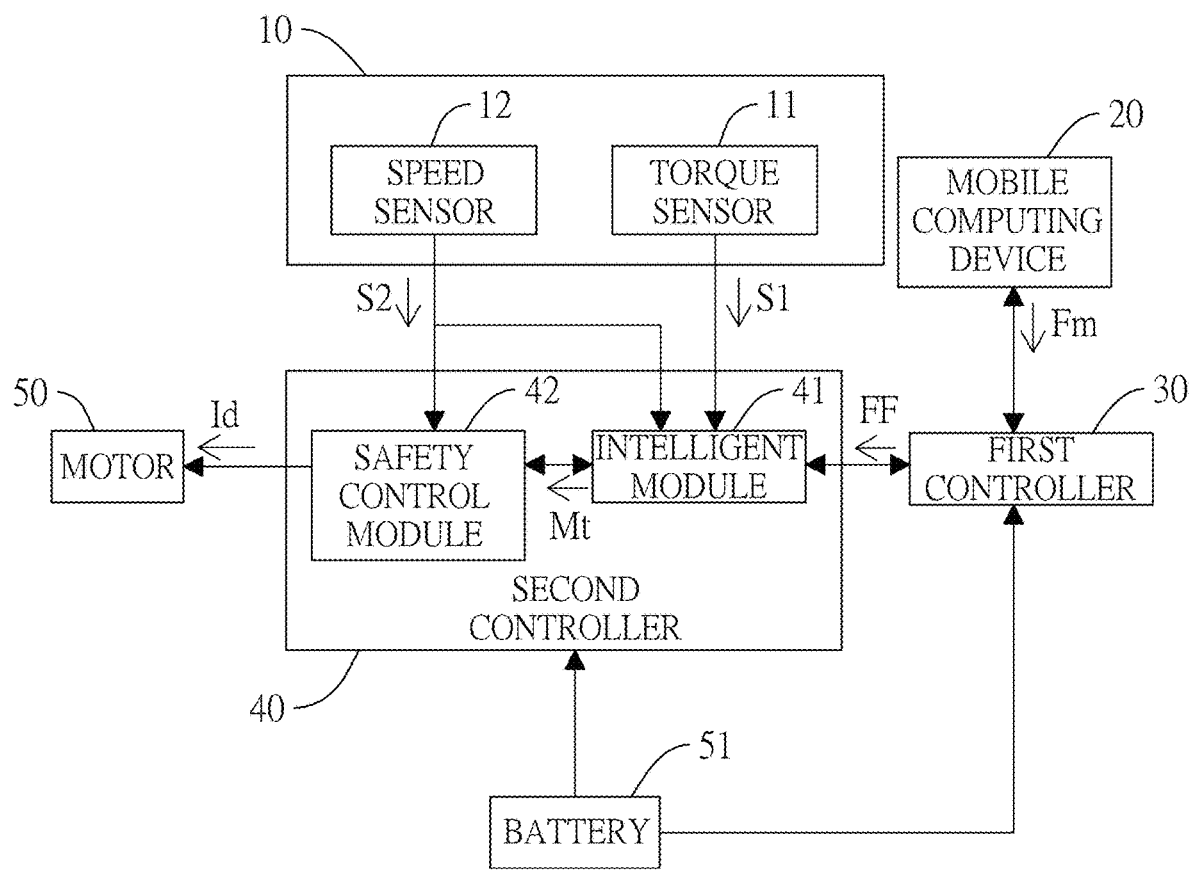
FIG. 1 is a block diagram of an auxiliary force control system for a power-assisted bicycle of the present invention.

The auxiliary force control system for a power-assisted bicycle of the present invention is applied to a power-assisted bicycle. With reference to FIG. 1, the power-assisted bicycle comprises a motor 50 and a battery 51. The motor 50 is connected to a wheel of the power-assisted bicycle. The system of the present invention can output a suitable motor driver current Id to the motor 50 to drive the motor 50 to exert an auxiliary force on the wheel.

With reference to FIG. 1, an embodiment of the auxiliary force control system of the present invention comprises a sensing device 10, a mobile computing device 20, a first controller 30, and a second controller 40. The sensing device 10, the mobile computing device 20, the first controller 30, and the second controller 40 are signally connected. The sensing device 10, the first controller 30, and the second controller 40 are mounted on the power-assisted bicycle. The battery 51 provides working power to the sensing device 10, the first controller 30, and the second controller 40. The first controller 30 and the second controller 40 are integrated-circuit chips with data processing function respectively. For example, the first controller 30 may be a vehicle control unit (VCU) of the power-assisted bicycle. The second controller 40 and the first controller 30 are two different controllers. The second controller 40 is configured to generate the motor driver current Id.

The sensing device 10 comprises multiple sensors. The sensors are mounted on the power-assisted bicycle respectively to sense and output sensing data in real time while the power-assisted bicycle is being ridden by the rider. For example, the sensing device 10 may receive a riding torque S1 and a riding speed S2 while the power-assisted bicycle is being ridden by the rider. It is to be understood that the detection for the riding torque S1 and the riding speed S2 is the ordinary skill in the related art and is not the focus of the present invention, so is introduced briefly as follows.

In general, the power-assisted bicycle comprises a bicycle frame, two wheels, a gear disc, a chain connected between the gear disc and one of the wheels, two cranks mounted to the gear disc, and two pedals mounted on the two cranks respectively. The above-mentioned structure of the power-assisted bicycle is just an example. The system of the present invention is applicable to other structures not limited to the above-mentioned structure. The sensing device 10 may comprise a torque sensor 11 and a speed sensor 12. The torque sensor 11 may be mounted to the crank and the gear disc. The speed sensor 12 includes a Hall-effect sensor and at least one magnet. The magnet may be fixed on a wheel frame of one wheel of the power-assisted bicycle. The Hall-effect sensor may be fixed on the bicycle frame. The position of the Hall-effect sensor corresponds to the moving trajectory of the magnet. Therefore, when the rider is riding the power-assisted bicycle, the signal generated by the torque sensor 11 may reflect the force (unit: Nm) exerted by the rider on the crank, defined as the riding torque S1, and the signal generated by the speed sensor 12 may reflect the wheel speed (unit: RPM) as well as the bicycle speed, defined as the riding speed S2.

The mobile computing device 20 may be an electronic device able to execute an artificial intelligent algorithm and having functions of network connection and GPS (Global Positioning System). For example, the mobile computing device 20 has a storage medium, such as a memory or a memory card, which stores programming codes of the artificial intelligent algorithm and a CPU (Central Processing Unit), which executes the programming codes. The mobile computing device 20 may be a smart phone, a smart watch, or a smart bracelet. The mobile computing device 20 stores programming codes of multiple artificial neural network (ANN) models. In the present invention, the ANN models include a first ANN model and a second ANN model to be executed. The mobile computing device 20 generates a tuning factor Fm via the computation of the first ANN model and the second ANN model. In the present invention, the programming codes of the first ANN model and the second ANN model are established and trained by a development tool of Visual Studio Code (VS code) and a programming language of Python. The present invention also adopts the Internet resources including PyTorch, Pandas, and multiple tools of Scikit-learn.

With reference to FIG. 2, the first ANN model 21 comprises an input layer 211, a hidden layer 212, and an output layer 213. The first ANN model 21 is formed as architectures of fully-connected artificial neural network. The first ANN model 21 generates output data according to personal data 230 and historical riding data 231, wherein the output data of the first ANN model 21 is a predicted grade V1. The predicted grade V1 is used to predict and indicate the riding skill of the rider. The personal data 230 reflects the body status of the user while riding the power-assisted bicycle. For example, the personal data 230 may include the user's age, weight, height, and gender. The historical riding data 231 reflects the user's riding experiences. For example, the historical riding data 231 may include average speed, average torque, maximum speed, maximum torque, trip distance, calories consumption, average heart rate, maximum heart rate, and a power mode of the power-assisted bicycle that are recorded by the mobile computing device 20 in the user's previous riding activities. In the present invention, the personal data 230 and the historical riding data 231 are input data of the first ANN model 21. The personal data 230 and the historical riding data 231 may be directly stored in the memory or the memory card of the mobile computing device 20 for being accessed by the first ANN model 21 while computing.

Basic principle for outputting the predicted grade V1 by the first ANN model 21 is introduced herein. The method to obtain the personal data 230 and the historical riding data 231 is the ordinary skill in the related art and is not the focus of the present invention. For example, the smart phone, the smart watch, or the smart bracelet at present already has functions to sense, compute, and store the above-mentioned average speed, maximum speed, trip distance, calories consumption, average heart rate, maximum heart rate, and so on, and can display an input interface to request the user to input the above-mentioned age, weight, height, and gender. On the other hand, the mobile computing device 20 may be signally connected to the vehicle control unit of the power-assisted bicycle via a substantial transmission cable or wireless communication. The vehicle control unit of the power-assisted bicycle may transmit the power mode of the power-assisted bicycle and the riding torque S1 and the riding speed S2 received from the sensing device 10 to the mobile computing device 20 for the mobile computing device 20 to store the riding torque S1, the riding speed S2, and the power mode of the power-assisted bicycle. Then, the mobile computing device 20 may compute to obtain the above-mentioned average speed, average torque, maximum speed, maximum torque, the power mode of the power-assisted bicycle, and so on. When the first ANN model 21 performs the computation according to the personal data 230 and the historical riding data 231, the first ANN model 21 will generate predict scores of levels of riding skills and scores respectively corresponding to the predict scores on the output layer 213. The score corresponding to the predict score indicates a confidence of the prediction. For example, the output layer 213 as shown in FIG. 2 has five nodes. The five nodes respectively correspond to five predict scores that are 1, 2, 3, 4, and 5. The higher predict score indicates the user may have better riding skill. The first ANN model 21 sets the predict score having the highest score (such as the highest confidence) as the predicted grade V1 and then outputs the predicted grade V1.

Regarding the training principle to the first ANN model 21, there are multiple personal data and multiple historical riding data collected as samples for training the first ANN model 21. Regarding the relevance between the input data and the output data of the first ANN model 21, for example, the personal data of an elderly include an old age, which means the physical fitness of an elderly person may be worse than a teen's. As a result, for the elderly person, the lower predict score may correspond to the higher score. Or, higher average speed included in the historical riding data indicates that the user has the ability to maintain a high speed, such that the higher predict score may correspond to the higher score. Hence, the relevance between the input data and the output data of the first ANN model 21 can be deduced. For the first ANN model 21, the activation function may be Softmax, the loss function may be Multi-Class Cross-Entropy Loss, the optimizer is Adam, and the learning rate is set to 0.001.

With reference to FIG. 3, the second ANN model 22 comprises an input layer 221, a hidden layer 222, and an output layer 223. The second ANN model 22 is formed as architectures of fully-connected artificial neural network. The predicted grade V1 outputted by the first ANN model 21, the personal data 230, and environment data 232 are input data of the input layer 221 of the second ANN model 22. The environment data 232 reflects the on-site environment around the user riding the power-assisted bicycle. The environment data 232 may include weather, temperature, time, location, wind speed, and so on. It is to be understood that the method to obtain the environment data 232 is the ordinary skill in the related art and is not the focus of the present invention. For example, the smart phone has the GPS function so as to generate a real-time positioning coordinate. The real-time positioning coordinate indicates the user's location. Besides, the smart phone can download the environment data 232 according to the real-time positioning coordinate from a meteorology resource website and/or map resource website and provide the input layer 221 of the second ANN model 22 with the environment data 232. The output layer 223 of the second ANN model 22 has an output node. The output data of the output node is the tuning factor Fm. The tuning factor is a real number greater than or equal to −1 and less than or equal to 1, such as $-1 \leq Fm \leq 1$.

a. Regarding the training principle to the second ANN model 22, there are multiple predicted grades, multiple personal data, and multiple environment data collected as samples for training the second ANN model 22. For the second ANN model 22, the activation function is a custom activation function, the loss function may be mean absolute error (MAE), the optimizer may be Adam, and the learning rate is set to 0.002. The custom activation function can be described as follows, wherein x is input and y is output.

$$\text{Custom activation function:} \begin{cases} x < -1; y = -1 \\ -1 \leq x \leq 1; y = x \\ x > 1; y = 1 \end{cases}$$

The following table discloses an example of the historical riding data 231 of the user.

| Historical riding data | | | | | |
| --- | --- | --- | --- | --- | --- |
| Average Speed (kph) | Average torque (Nm) | Maximum speed (kph) | Maximum torque (Nm) | Trip distance (km) | Calories consumption (kcal) |
| 12 | 20 | 25 | 150 | 6 | 250 |
| Average heart rate (bpm) | Maximum heart rate (bpm) | Riding date | Riding time | Power mode | |
| 80 | 120 | 10-June | 14:00 | ECO | |

The following table discloses an example of the personal data 230 of the user.

| Personal data | | | |
| --- | --- | --- | --- |
| Weight | Height | Gender | Age |
| 50 kg | 165 cm | Female | 20 |

The first ANN model 21 can output the predicted grade V1 based on the historical riding data 231 and the personal data 230 as disclosed in the above-mentioned tables.

The following table discloses an example of the environment data 232.

| Environment data | | | | |
| --- | --- | --- | --- | --- |
| Weather | Temperature | Time | Location | Wind speed |
| Sunny | 25° C. | 08:00 | Riverside | Strong |

The second ANN model 22 can output the tuning factor Fm based on the predicted grade V1, the personal data 230, and the environment data 232 as disclosed in the above-mentioned tables.

The first controller 30 is signally connected to the mobile computing device 20 via a substantial transmission cable or wireless communication to receive the tuning factor Fm from the mobile computing device 20. The first controller 30 may be the vehicle control unit (VCU) able to set the power mode of the power-assisted bicycle. For example, the power mode may comprise an ECO mode, a normal mode, a sport mode, and a boost mode. The first controller 30 stores multiple mode factors Fn. Different power modes respectively correspond to different mode factors Fn. The mode factor Fn is a real number. For example, the mode factors of the ECO mode, the normal mode, the sport mode, and the boost mode are represented as Fn1, Fn2, Fn3, and Fn4 respectively, wherein Fn1<Fn2<Fn3<Fn4. The first controller 30 generates a final factor FF according to the trimming factor Fm, the mode factor Fn, and a gap-range factor Gp. The gap-range factor Gp is used to adjust the tuning factor Fm. The gap-range factor Gp is a value which is set according to the selected mode factor Fn and the personal status of the user.

In the present invention, the final factor FF may be represented as FF=Fn+Fm*Gp. For example, Fn1=0.4, Fn2=0.6, Fn3=0.8, and Fn4=1. The tuning factor Fm is 0.5. The gap-range factor Gp is 0.2. When the power mode of the power-assisted bicycle is set as the boost mode, the final factor FF will be equal to 1.1, wherein FF=1+0.5*0.2.

The second controller 40 is signally connected to the sensing device 10, the first controller 30, and the motor 50. For example, the second controller 40 may be signally connected to the sensing device 10 and the first controller 30 via substantial transmission cables, and connected to the motor 50 via a substantial power cable. The second controller 40 receives the final factor FF from the first controller 30. As shown in FIG. 1, the second controller 40 comprises an intelligent module 41 and a safety control module 42. The intelligent module 41 generates a parameter Mt of target output of the motor 50 according to the final factor FF, the riding torque S1, and the riding speed S2. The safety control module 42 generates a motor driver current Id according to the parameter Mt of target output of the motor 50 and outputs the motor driver current Id to the motor 50 to drive the motor 50. By doing so, the motor 50 is driven to exert a corresponding auxiliary force on the wheel.

Figure 4:
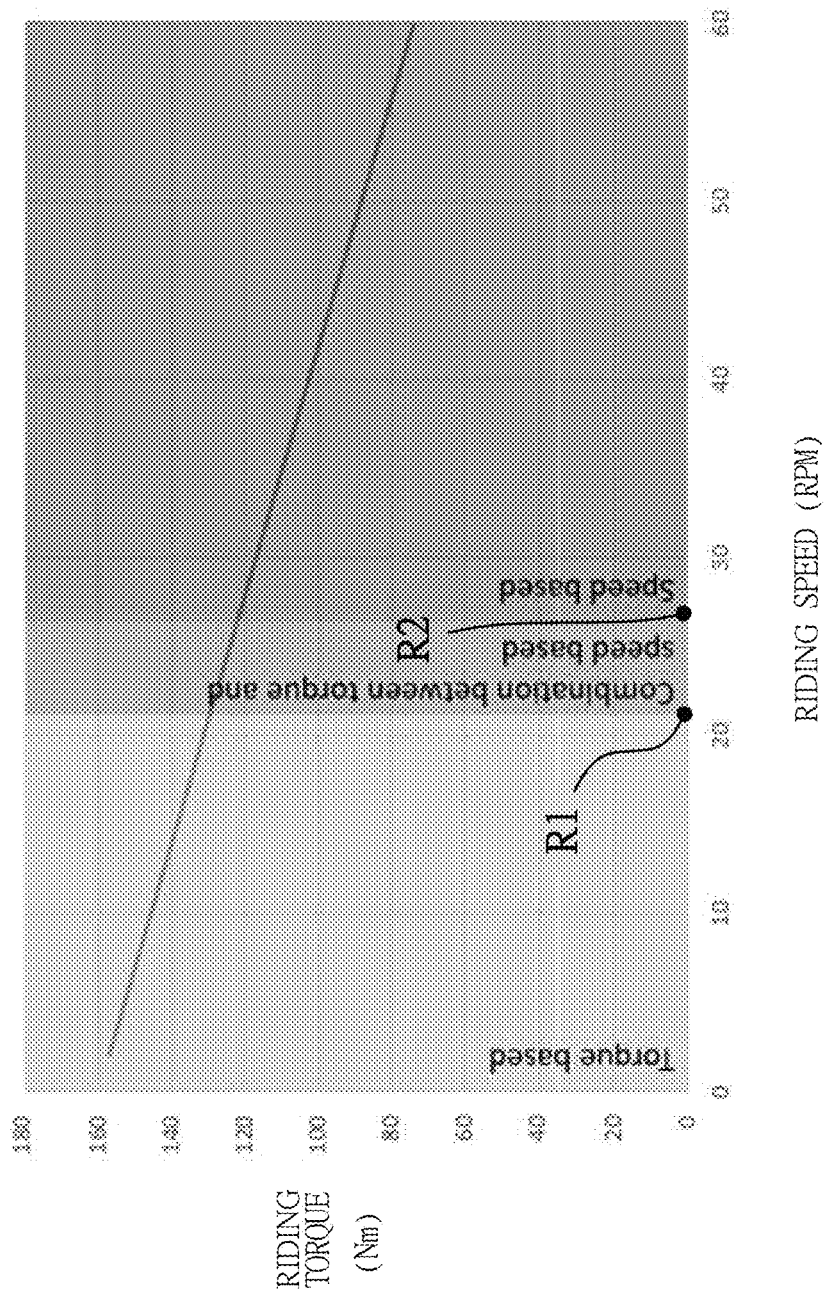
FIG. 4 is a schematic diagram for a second controller to determine the torque-based auxiliary, the speed-based auxiliary, and the combination auxiliary between torque-based and speed-based of the present invention.

In the present invention, with reference to FIG. 4, the intelligent module 41 stores a lower speed limit R1 and an upper speed limit R2. The lower speed limit R1 and the upper speed limit R2 are adjustable preset values. When the intelligent module 41 determines that the riding speed S2 is less than the lower speed limit R1, the intelligent module 41 performs a torque-based auxiliary to compute a first parameter Mt_t of target output of the motor 50 according to the riding torque S1 and the final factor FF, wherein Mt=Mt_t=S1×FF. In other words, the first parameter Mt_t of target output of the motor 50 is a torque value. The safety control module 42 has a torque-current corresponding table. The torque-current corresponding table includes multiple torque values and multiple current values respectively corresponding to the torque values. The relevance between the torque values and the current values in the torque-current corresponding table is the positive correlation. By searching in the torque-current corresponding table, the safety control module 42 defines one of the current values, which corresponds to the first parameter Mt_t of target output of the motor, as the motor driver current Id via the torque-current corresponding table.

When the intelligent module 41 determines that the riding speed S2 is greater than the upper speed limit R2, the intelligent module 41 performs a speed-based auxiliary to compute a second parameter Mt_s of target output of the motor 50 according to the riding speed S2 and the final factor FF, wherein Mt=Mt_s=S2×FF. In other words, the second parameter Mt_s of target output of the motor 50 is a speed value. The safety control module 42 has a speed-current corresponding table. The speed-current corresponding table includes multiple speed values and multiple current values respectively corresponding to the speed values. The relevance between the speed values and the current values in the speed-current corresponding table is the positive correlation. By searching in the speed-current corresponding table, the safety control module 42 defines one of the current values, which corresponds to the second parameter Mt_s of target output of the motor 50, as the motor driver current Id via the speed-current corresponding table.

When the intelligent module 41 determines that the riding speed S2 is greater than or equal to the lower speed limit R1 and less than or equal to the upper speed limit R2, the intelligent module 41 performs a combination auxiliary between torque-based and speed-based to compute a third parameter Mt_c of target output of the motor 50 according to the riding torque S1, the riding speed S2, and the final factor FF, wherein Mt=Mt_c=[f(S1,S2)]×FF. The third parameter Mt_c of target output of the motor 50 is a value. In the equation, f(S1,S2) is a function of the riding torque S1 and the riding speed S2 to vary with S1 and S2. The safety control module 42 has a parameter-current corresponding table. The parameter-current corresponding table includes multiple parameter values and multiple current values respectively corresponding to the parameter values. The relevance between the parameter values and the current values in the parameter-current corresponding table is the positive correlation. By searching in the parameter-current corresponding table, the safety control module 42 defines one of the current values, which corresponds to the third parameter Mt_c of target output of the motor 50, as the motor driver current Id via the parameter-current corresponding table.

For example, the final factor FF may be 0.22. Under the above-mentioned torque-based auxiliary, when the riding torque S1 sensed by the sensing device 10 is 157 Nm, the first parameter Mt_t of target output of the motor 50 computed by the intelligent module 41 is 34.54. At this moment, the motor 50 driven by the corresponding motor driver current Id will exert a torque force equal to 34.54 Nm on the power-assisted bicycle. In addition, under the above-mentioned speed-based auxiliary, when the riding speed S2 sensed by the sensing device 10 is 25.2 RPM, the second parameter Mt_s of target output of the motor 50 computed by the intelligent module 41 is 5.544. At this moment, the motor 50 driven by the corresponding motor driver current Id will increase a speed equal to 5.544 for the power-assisted bicycle. It is to be deduced that under the above-mentioned combination auxiliary between the torque-based and the speed-based, the motor 50 driven by the corresponding motor driver current Id will increase the torque force and the speed specifically for the power-assisted bicycle.

Figure 5:
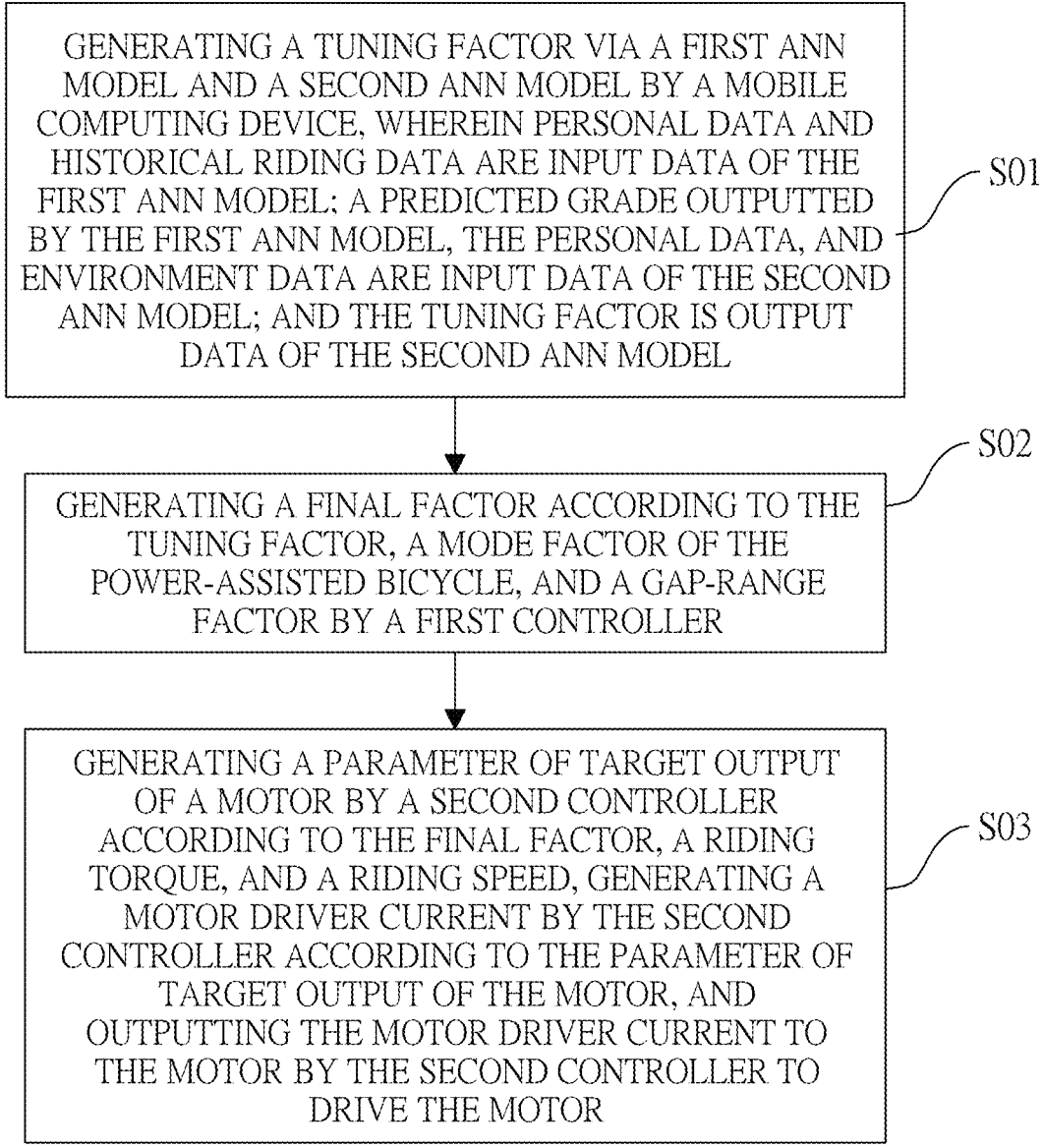
FIG. 5 is a flow chart of the auxiliary force control method for a power-assisted bicycle of the present invention.

In summary, with reference to FIG. 5, the auxiliary force control method of the present invention comprises the following steps.

STEP S01: The mobile computing device 20 generates the tuning factor Fm via the first ANN model 21 and the second ANN model 22. The personal data 230 and the historical riding data 231 are the input data of the first ANN model 21. The predicted grade V1 outputted by the first ANN model 21, the personal data 230, and the environment data 232 are the input data of the second ANN model 22. The tuning factor Fm is the output data of the second ANN model 22.

STEP S02: The first controller 30 generates the final factor FF according to the tuning factor Fm, the mode factor Fn, and the gap-range factor Gp, wherein FF=Fn+Fm*Gp.

STEP S03: The second controller 40 generates the parameter Mt of target output of the motor 50 according to the final factor FF, the riding torque S1, and the riding speed S2, generates the motor driver current Id according to the parameter Mt of target output of the motor 50, and outputs the motor driver current Id to the motor 50. By doing so, the motor 50 driven by the motor driver current Id will provide a corresponding auxiliary force.

The present invention also provides an overspeed protection effect. The safety control module 42 of the second controller 40 can determine whether the instant riding speed S2 is equal to or greater than a restricted speed. The restricted speed may be 25 kilometers-per-hour as an example. The restricted speed is an adjustable preset value. When the safety control module 42 determines that the riding speed S2 is equal to or greater than the restricted speed, which means the instant bicycle speed is too fast, the safety control module 42 may gradually reduce the motor driver current Id or stop outputting the motor driver current Id to the motor 50, in order to avoid still providing the auxiliary force while over speed riding.

In conclusion, the mobile computation device 20 performs the computation of the programming codes of the artificial intelligent algorithms of the first ANN model 21 and the second ANN model 22 to generate the tuning factor Fm. The tuning factor Fm is computed based on the user's physical fitness (corresponding to the historical riding data 231 and the personal data 230) and the on-site environment (corresponding to the environment data 232), to be one of the factors for controlling the motor 50. For example, the user of 80 kg weight will need a higher auxiliary force than another user of 45 kg weight. Or, the user of higher predicted grade V1 will need a lower auxiliary force than another user of lower predicted grade V1. Or, the user of mountain riding will need a lower auxiliary force than the user riding on the flat road. Or, the user riding on a sunny day will need a higher auxiliary force than the user riding on a raining day. Therefore, the motor 50 may provide a suitable auxiliary force for different users and different riding environments. The user will comfortably ride the power-assisted bicycle by the smooth intelligent assistance of the present invention.

What is claimed is:

1. An auxiliary force control system for a power-assisted bicycle, applied to a power-assisted bicycle having a motor, the auxiliary force control system comprising:
    a sensing device mounted on the power-assisted bicycle to receive a riding torque and a riding speed;
    a mobile computing device generating a tuning factor via a first Artificial Neural Network (ANN) model and a second ANN model, wherein
        personal data and historical riding data are input data of the first ANN model;
        a predicted grade outputted by the first ANN model, the personal data, and environment data are input data of the second ANN model; and
        the tuning factor is output data of the second ANN model;
    a first controller mounted on the power-assisted bicycle, signally connected to the mobile computing device to receive the tuning factor, and generating a final factor according to the tuning factor, a mode factor of the power-assisted bicycle, and a gap-range factor; and
    a second controller mounted on the power-assisted bicycle, signally connected to the sensing device, the first controller, and the motor, and comprising an intelligent module and a safety control module, wherein
        the intelligent module generates a parameter of target output of the motor according to the final factor, the riding torque, and the riding speed;
        the safety control module generates a motor driver current according to the parameter of target output of the motor and outputs the motor driver current to the motor to drive the motor;
        the intelligent module stores a lower speed limit and an upper speed limit;
        when the intelligent module determines that the riding speed is less than the lower speed limit, the intelligent module computes a first parameter of target output of the motor according to the riding torque and the final factor; the safety control module has a torque-current corresponding table and defines the motor driver current according to the first parameter of target output of the motor via the torque-current corresponding table;
        when the intelligent module determines that the riding speed is greater than the upper speed limit, the intelligent module computes a second parameter of target output of the motor according to the riding speed and the final factor; the safety control module has a speed-current corresponding table and defines the motor driver current according to the second parameter of target output of the motor via the speed-current corresponding table; and
        when the intelligent module determines that the riding speed is greater than or equal to the lower speed limit and less than or equal to the upper speed limit, the intelligent module computes a third parameter of target output of the motor according to the riding torque, the riding speed, and the final factor; the safety control module has a parameter-current corresponding table and defines the motor driver current according to the third parameter of target output of the motor via the parameter-current corresponding table.

2. The system as claimed in claim 1, wherein the first controller is a vehicle control unit of the power-assisted bicycle.

3. The system as claimed in claim 1, wherein when the safety control module determines that the riding speed is equal to or greater than a restricted speed, the safety control module reduces the motor driver current or stops outputting the motor driver current to the motor.

4. The system as claimed in claim 1, wherein the first ANN model and the second ANN model are respectively formed as architectures of fully-connected artificial neural networks.

5. An auxiliary force control method for a power-assisted bicycle, comprising steps of:
    generating a tuning factor via a first Artificial Neural Network (ANN) model and a second ANN model by a mobile computing device, wherein
        personal data and historical riding data are input data of the first ANN model;
        a predicted grade outputted by the first ANN model, the personal data, and environment data are input data of the second ANN model; and
        the tuning factor is output data of the second ANN model;

generating a final factor according to the tuning factor, a mode factor of the power-assisted bicycle, and a gap-range factor by a first controller; and generating a parameter of target output of a motor by a second controller according to the final factor, a riding torque, and a riding speed, generating a motor driver current by the second controller according to the parameter of target output of the motor, and outputting the motor driver current to the motor by the second controller to drive the motor; wherein the second controller stores a lower speed limit and an upper speed limit;

when the second controller determines that the riding speed is less than the lower speed limit, the second controller computes a first parameter of target output of the motor according to the riding torque and the final factor; the second controller has a torque-current corresponding table and defines the motor driver current according to the first parameter of target output of the motor via the torque-current corresponding table;

when the second controller determines that the riding speed is greater than the upper speed limit, the second controller computes a second parameter of target output of the motor according to the riding speed and the final factor; the second controller has a speed-current corresponding table and defines the motor driver current according to the second parameter of target output of the motor via the speed-current corresponding table;

when the second controller determines that the riding speed is greater than or equal to the lower speed limit and less than or equal to the upper speed limit, the second controller computes a third parameter of target output of the motor according to the riding torque, the riding speed, and the final factor; the second controller has a parameter-current corresponding table and defines the motor driver current according to the third parameter of target output of the motor via the parameter-current corresponding table.

6. The method as claimed in claim 5, wherein when the second controller determines that the riding speed is equal to or greater than a restricted speed, the second controller reduces the motor driver current or stops outputting the motor driver current to the motor.

7. The method as claimed in claim 5, wherein the first ANN model and the second ANN model are respectively formed as architectures of fully-connected artificial neural networks.

* * * * *